United States Patent [19]

Andersen et al.

[11] Patent Number: 4,811,258

[45] Date of Patent: Mar. 7, 1989

[54] DIGITAL OPTICAL INTERACTION GATE

[75] Inventors: David R. Andersen, Solon; Robert R. Cuykendall, Iowa City, both of Iowa

[73] Assignee: University of Iowa Research Foundation, Iowa City, Iowa

[21] Appl. No.: 22,907

[22] Filed: Mar. 6, 1987

[51] Int. Cl.$^4$ ................................................ G06F 7/56
[52] U.S. Cl. .................................................... 364/713
[58] Field of Search ............... 364/713, 807, 822, 837

[56] References Cited

PUBLICATIONS

Toffoli, *Bicontinuous Extensions of Invertible Combinatorial Function*, Math. Systems Theory 14, pp. 13-23, 1981.
Landauer, "Fundamental Physical Limitations of the Computational Process", Annals N.Y. Academy of Sciences, 1985; 426, pp. 161-170.
Kaplan, *Theory of Hysteresis Reflection and Refraction of Light by a Boundary of a Nonlinear Medium*, Sov. Phys. JETP 45(5), 5/1977, pp. 896-905.
Tomlinson et al., *Reflection of a Gaussian Beam at a Nonlinear Interface*, Applied Optics, vol. 21, No. 11; Jun. 1, 1982, pp. 2041-2051.
Smith et al., *Experimental Studies of a Nonlinear Interface*, IEEE Journal of Quantum Electronics, vol. QE-17, No. 3, 3/1981, pp. 340-348.
Smith et al., *Optical Bistability at a Nonlinear Interface*, Appl. Phys. Lett, 35(11), Dec. 1, 1979, pp. 846-848.
Shamir et al., *Optical Computing and the Fredkin Gates*, Applied Optics, vol. 25, No. 10, May 15, 1986, pp. 1604-1607.
Korpel et al., *Polarization and Optical Bistability*, Applied Optics, vol. 25, No. 10, May 15, 1986, pp. 1528-1529.
Wherritt, *All-Optical Computation—A Parallel Integrator Based Upon a Single Gate Full Adder*; Optics Com., vol. 56, No. 2, Nov. 15, 1985, pp. 87-92.
Fredkin et al., *Conservative Logic*, Int. Journal of Theo. Physics, vol. 21, Nos. 3/4, 1982, pp. 219-253.
Toffoli, *Reversible Computing*, MIT Lab. for Computer Science, 545 Technology Sq., Cambridge, Mass. 02139, pp. 633-644.
Cuykendall et al., *Control-Specific Optical Fredkin Circuits*, Univ. of Iowa, Dept. Electrical and Computer Engineering.
Feynman, *Quantum Mechanical Computers*, Foundation of Physics, vol. 16, No. 6, 1986, pp. 507-531.

*Primary Examiner*—Gary V. Harkcom
*Assistant Examiner*—Tan V. Mai
*Attorney, Agent, or Firm*—Henderson & Sturm

[57] ABSTRACT

A reversible, all optical implementation of an interaction gate. One embodiment of the interaction gate is a dual-beam version of an optical nonlinear interface. A second embodiment is a dual-beam Fabry-Perot (F-P) switch. The device is a universal computation building block from which arbitrary computing circuits can be constructed.

22 Claims, 5 Drawing Sheets

PRIOR ART

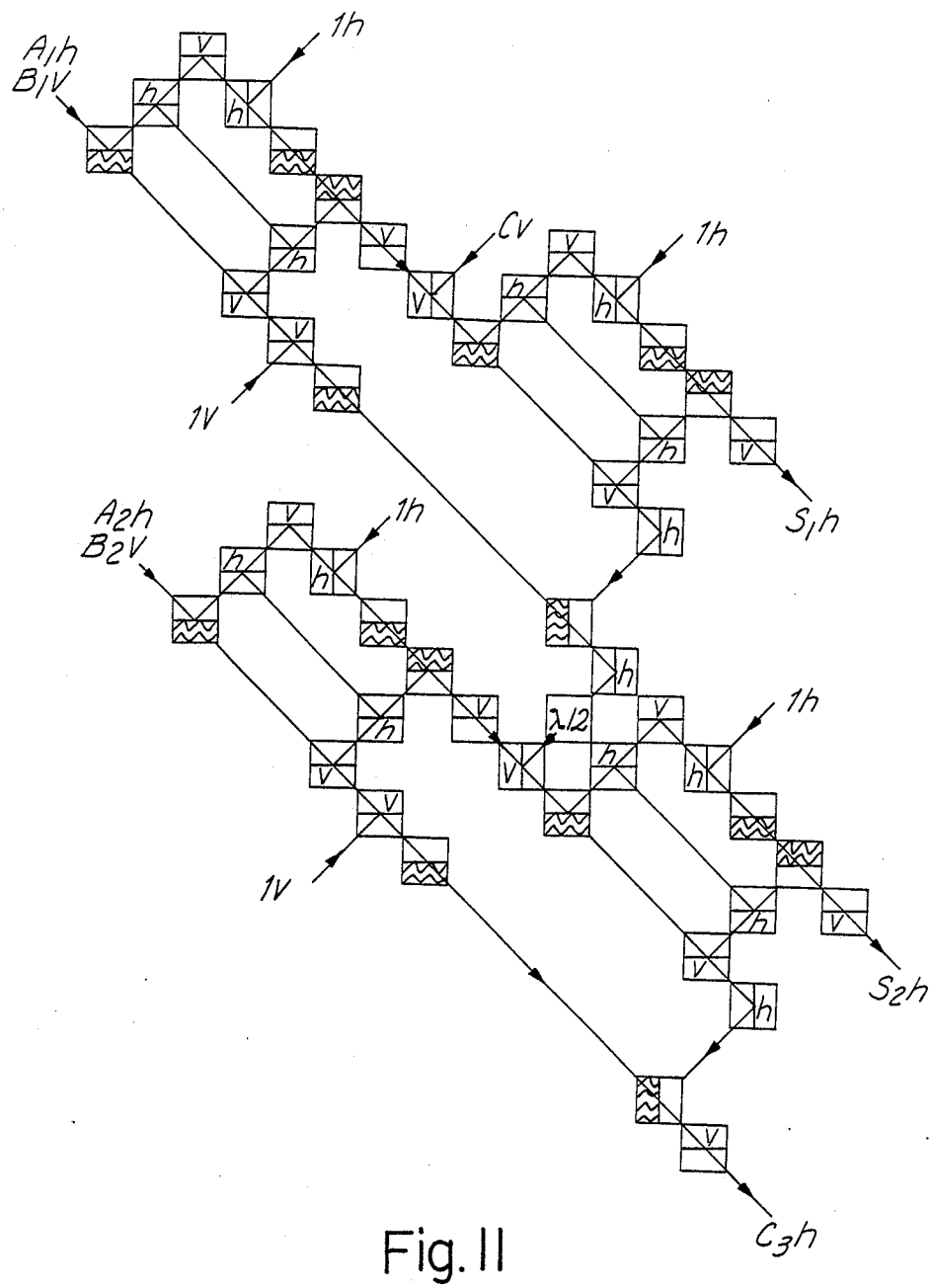
Fig. II 4,811,258

DIGITAL OPTICAL INTERACTION GATE

TECHNICAL FIELD

This invention relates to components useful in optical computing circuits, and more particularly to a reversible optical logic gate.

BACKGROUND ART

The theory of reversible computing is based upon composition of invertible primitives. In a conventional computer, the computation is logically organized around computing primitives, such as the NAND gate, which are non-invertible. Thus, when performing the AND operation, a certain amount of information about the system's past is generally erased. This loss of information or damping associated with an irreversible process must, according to the laws of physics, be accompanied by the thermalization of an about $k_BT$ of energy per bit. (See R. Landauer, Annals NY Acad. Sci. 426, 161 (1985); E. Fredkin and T. Toffoli, Int'l. J. Theor. Phys. 21, 219 (1982)). Interest in reversible computation thus arises from the desire to reduce heat dissipation in computing circuits, thereby allowing higher density and speed.

It appears possible in principle (See E. Fredkin and T. Toffoli, Intl. J. Theor. Phys. 21 (1982) 219; T. Toffoli, Seventh Colloq. Automata, Lang. and Prog., J. W. deBakker and J. van Leeuwen, eds., Springer, Berlin, (1980) 632; T. Toffoli, Math. Systsm. Th. 14 (1981) 13; and R. P. Feynman, Found. Phys. 16 (1986) 507) to design computing mechanisms which, if operated strictly in accordance with the laws of microphysics, dissipate zero free energy internally. Dissipation in such circuits would arise only in reading the output, which amounts to clearing the computer for further use. This total decoupling between the computational modes (due to signal interactions) and thermal modes is effectively achieved by reversing the computation after the results have been computed, restoring the circuit to its initial configuration.

In today's electronic semiconductor computers, the interaction of signals and signal damping/regeneration processes are usually inextricably intertwined within the same physical device (e.g. transistor), and are thus inseparable. Even if reversible gates were employed virtually every primitive computational step would involve unavoidable damping and regeneration of signals, with resultant dramatic heat loss. However, in other technologies—such as optical or superconducting systems—the decoupling between mechanical interaction modes and thermal ones can be effectively achieved. Such systems may, therefore, provide the way for a more natural correspondence between computation and fundamental principles of physics, leading to the realization of high-performance computing structures.

Optical implementation of various kinds of computing gates has been difficult in the past. In some cases, a gate can be implemented. (See B. S. Wherrett, Opt. Commun. 56 (1985) 87). But the output power from the gate is so low that cascading these gates into useful optical computing elements is impossible. Previously proposed implementations (See J. Shamir, H. Caulfield, W. Micelli, and R. Seymour, Appl. Opt. 25 (1986) 1605) of reversible computing gates suffer from additional problems. (See R. Cuykendall and D. McMillin, Appl. Opt. 26, (1987) 1959). In order for the gate to function as a completely reversible optical gate, no distinction can be made between the inputs. Each must be of the same type (in this case optical) and at the same level. Although gates not meeting the criteria described here have been shown useful for designing optical computing systems, (See R. Cuykendall and D. McMillin, Appl. Opt. 26, (1987) 1959), the unrestricted type of gate permits a significant reduction in circuit complexity.

An analysis of the nonlinear interface which assumes Gaussian beams of finite cross section and a nonlinear index of refraction proportional to the local intensity $I(x,y)$ has been reported. (See W. J. Tomlinson, J. P. Gordon, P. W. Smith, and A. E. Kaplan, Appl. Opt. 21, 2041 (1982)). This analysis leads to significantly different predictions than the plane wave analysis of Kaplan, (See A. E. Kaplan, Sov. Phys. JEP 45, 896 (1977)). Specifically, a series of self-focussed channels in the nonlinear transmission region, the absence of hysteresis in the reflection coefficient, and a reflection coefficient which does not approach zero at some critical intensity (i.e., no transparentization of the interface) are predicted. However, the analysis assumes there is no diffusion of the nonlinear mechanism (free carriers, heat, or excited gas atoms). When diffusion is present, as in all real systems, an the diffusion length associated with the nonlinearity is of the order of or larger than the beam cross section, the nonlinear component to the index of refraction is approximately constant across the Gaussian beamwidth, precluding formation of self-focussed channels. Thus, the plane wave theory with its associated predictions of hysteresis and total transparentization of the interface for a critical intensity, more closely models real systems. Experimental results (See P. W. Smith, J. P. Hermann, W. J. Tomlinson, and P. J. Maloney, Appl. Phys. Lett. 35, 846 (1979); P. W. Smith, W. J. Tomlinson, P. J. Maloney, and J. P. Hermann, J. Quant. Elect. QE-17, 340 (1981)) exhibit such hysteresis of the reflection coefficient supporting the plane wave approximation.

DISCLOSURE OF THE INVENTION

The present invention provides a reversible all optical computation-universal signal interaction gate. One embodiment (RNI) of the interaction gate is based upon the bistable nonlinear interface. A second embodiment is based upon an appropriate reversible Fabry-Perot (F-P) switch oriented at 45° from the beam axis (RFP).

In the embodiment using the reversible nonlinear interface (RNI), the device uses a known physical phenomenon, specifically nonlinear reflection and refraction at an interface, to create an optical logic gate. In the embodiment using the Fabry-Perot (RFP) the device uses a known physical phenomenon, specifically, nonlinear resonance switching due to an intensity dependent index of refraction. Until these implementations were conceived the gate, called an interaction gate, was purely a mathematical abstraction. The RNI/RFP can be used to implement arbitrarily complex optical computing circuits. The RNI/RFP is a two input-four output optical interaction device with four logical states. It is a universal computing primitive realizing both AND and NOT. The device is bit conserving (signals neither created nor destroyed) and reversible (information lossless), hence in principle can be made minimally dissipative. Additionally, various minimal adder circuits have been designed using the RNI/RFP. Such circuits are new, as no one has ever designed adder circuits using the interaction gate.

With optical systems using the interaction gate of the present invention, the decoupling between mechanical interaction modes and thermal ones can be effectively achieved. Reversible interactions in these technologies may, therefore, provide the way for a more natural correspondence between computation and fundamental principles of physics, leading to the realization of ultra high-performance computing structures.

Although not without some free energy loss, the physical processes underlying a change in the optical constants of a solid permit relatively low absorption with an associated change in the index of refraction sufficient to observe bistable hysteresis and switching at the interface. Thus, only a small amount of the signal intensity would be absorbed as it passed through the gate (the dissipation is related to Kramers-Kronig inverse of index of refraction). Also, due to the reversible nature of the gate, in no case would be it required to serve as a sink for input energy. The result is a computation-universal optical computing gate that more fully exploits the underlying laws of microphysics.

Because the RNI/RFP is a universal computing primitive, it can be used to construct any computing circuit of arbitrary complexity. Thus, standard types of computers can be constructed optically using this device. In addition, the reversible nature of the RNI suggests its use in non-standard ways. An immediate application to neural-net computer architectures utilizing the efficient global communications attributes of optics is an all-optical neural computer, which thus avoids undesirable electro-optic interfaces.

An object of the present invention is the provision of an improved optical logic gate.

Another object is to provide an optical logic gate that is reversible.

A further object of the invention is the provision of an optical interaction gate that is utilized in designing all-optical circuits.

Still another object is to provide an optical logic gate that is bit conserving, thus energy conserving (no energy dissipated except for inherent absorption).

A still further object of the present invention is the provision of an optical logic gate with minimal absorption.

Yet another object is to provide an optical logic gate with three-port device characteristics (cascadable and insensitive to line-level fluctuations).

Another object of the present invention is the provision of a universal computing primitive with a single device.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

Figure 3:
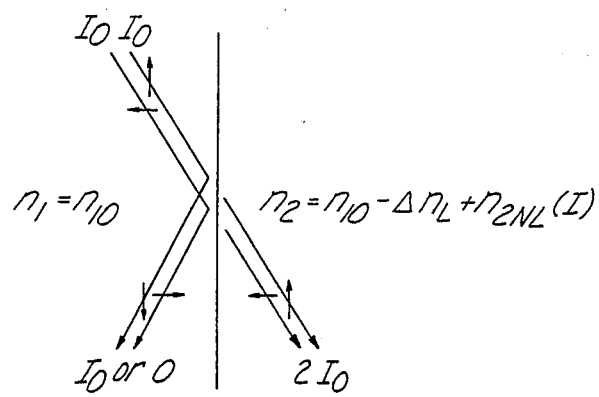
Figure 4:
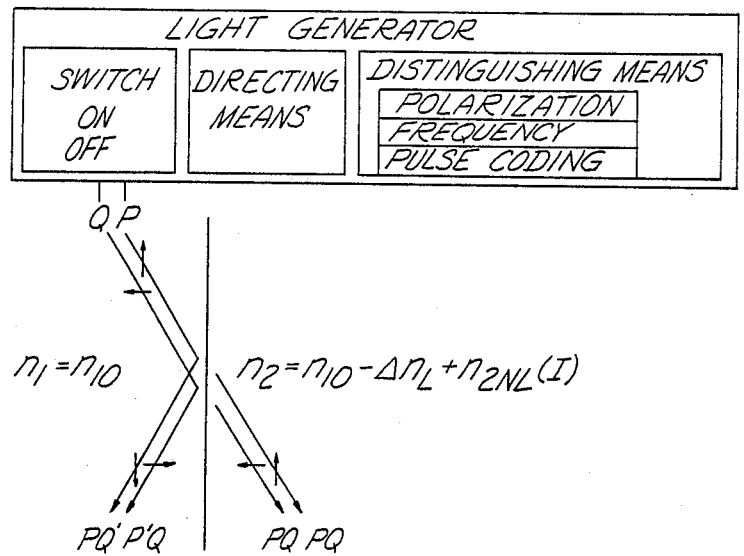
Figure 5:
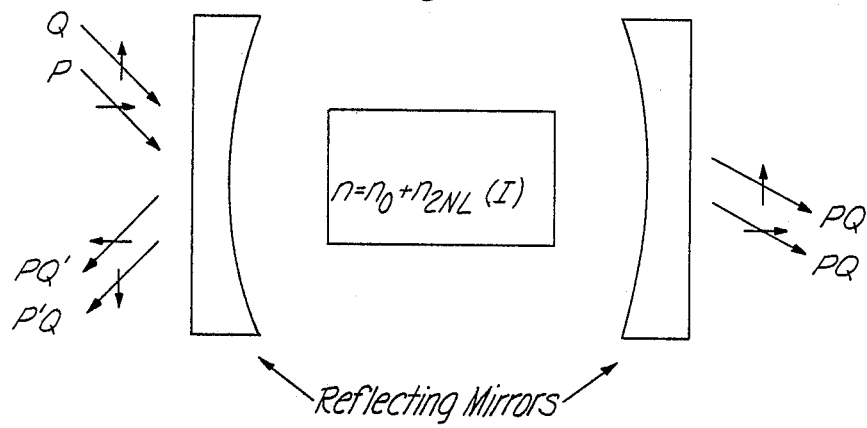
Figure 6:
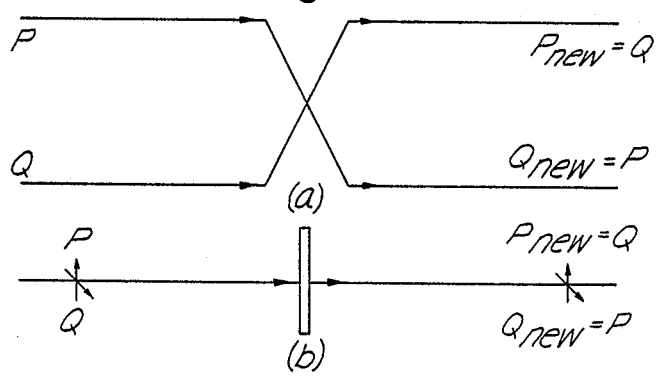
Figure 8:
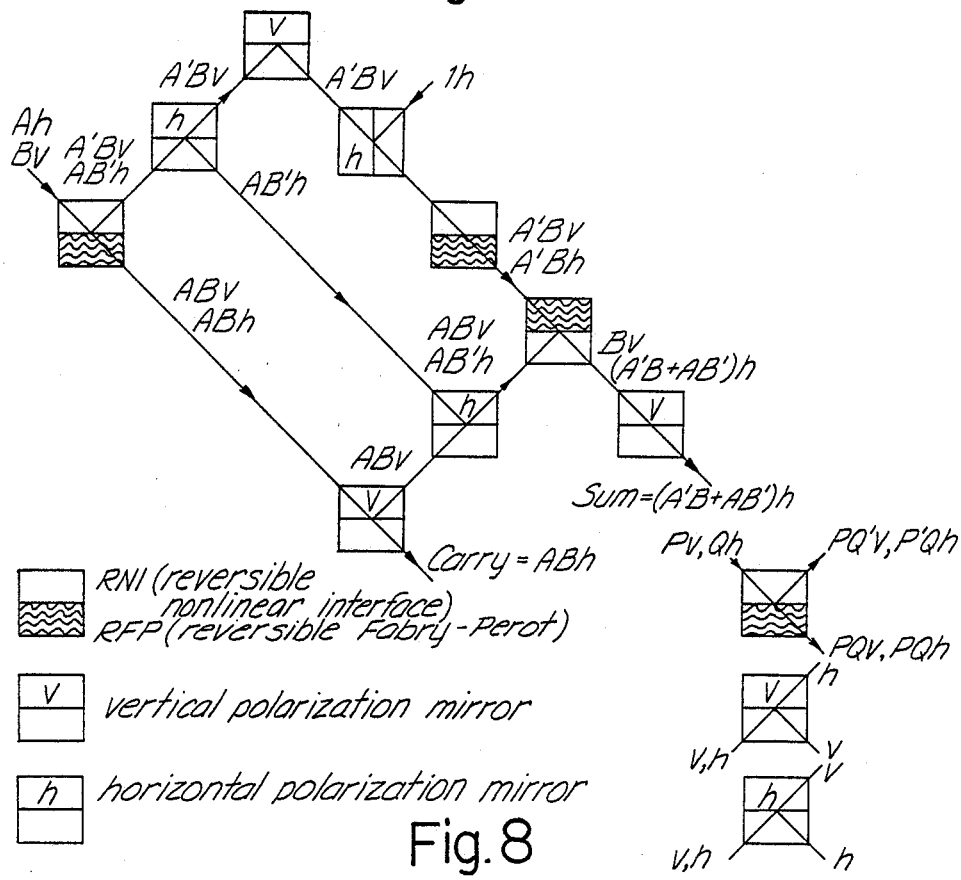
Figure 9:
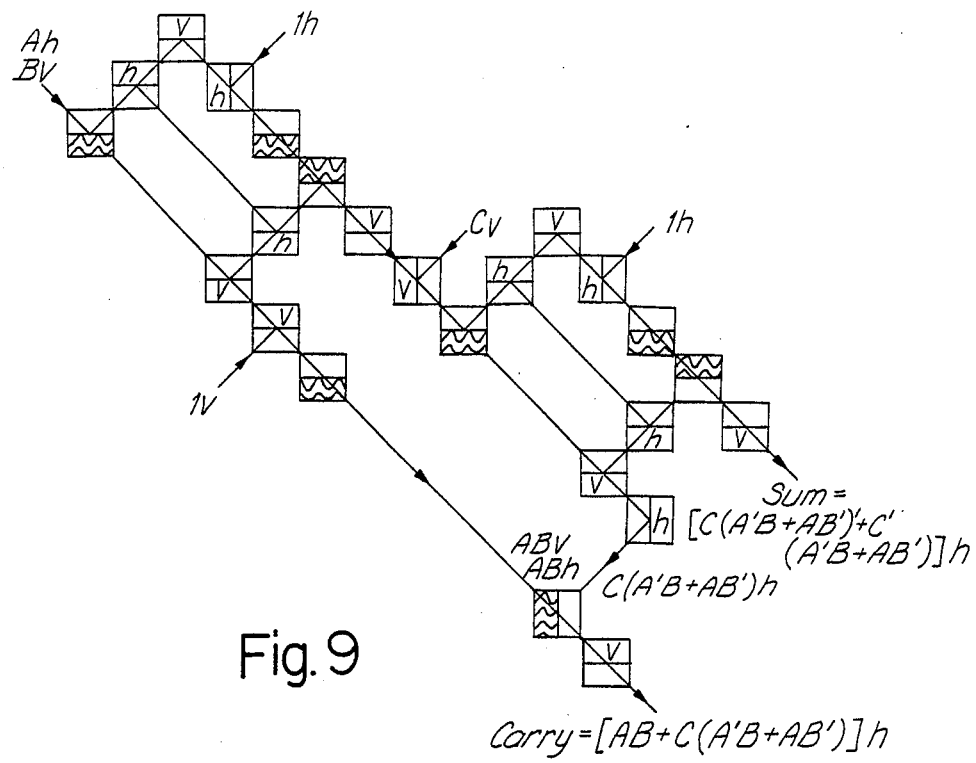
Figure 10:
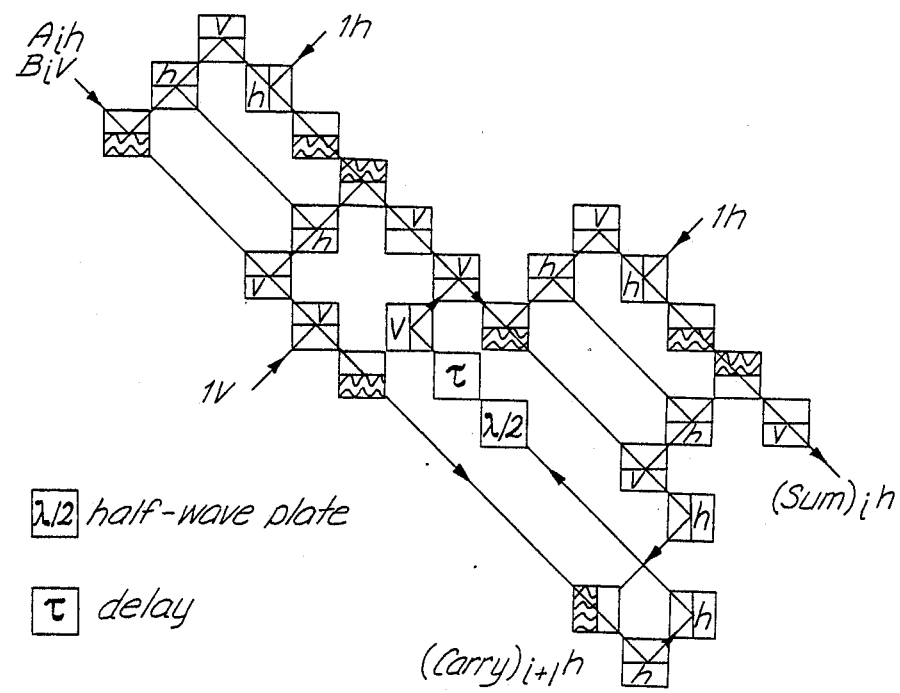

for the nonlinear interfact in the plane wave approximation;

FIG. 3 is a schematic showing a nonlinear interface with signal beams of intensity $I_O$ and both polarizations incident at the angle $\theta_{inc}$;

FIG. 4 is a schematic showing the RNI with inputs and outputs labelled where P is the vertically polarized input beam and Q ia the horizontally polarized input beam;

FIG. 5 is a schematic showing the interaction gate implemented with a Fabry-Perot cavity illustrating the RFP with inputs and outputs labelled where P is the vertically polarized input beam and Q is the horizontally polarized input beam;

FIG. 6 is a schematic showing a CROSSOVER circuit element:
  (a) generalized diagram; and
  (b) use of the half-wave plate to form CROSSOVER of polarization-coded interaction gate inputs;

FIG. 7 is a schematic showing a minimal adder circuit using the interaction gate:
  (a) cascadable half-adder; and
  (b) cascadable full-adder;

FIG. 8 is a schematic showing an RNI (RFP) half-adder;

FIG. 9 is a schematic showing an RNI (RFP) full-adder;

FIG. 10 is a schematic showing an RNI (RFP) sequential n-bit adder; and

FIG. 11 is a schematic showing an RNI (RFP) cascade adder.

BEST MODE FOR CARRYING OUT THE INVENTION

Figure 1:
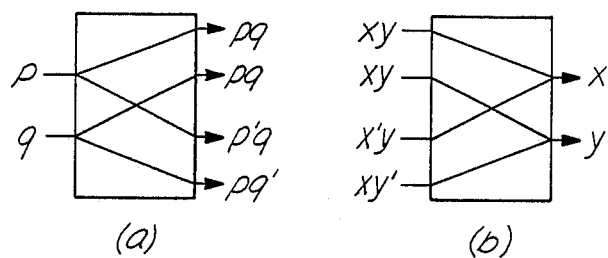
FIG. 1 is a schematic showing:
  (a) the interaction gate; and
  (b) its inverse.

Referring now to the drawings, the interaction gate (See E. Fredkin and T. Toffoli, Intl. J. Theor. Phys. 21 (1982) 219) shown in FIG. 1 (where the prime symbol indicates negation) is a two-input, four-output signal-interaction primitive. It is a universal computing primitive (i.e., constitutes a complete logic-function set for computing arbitrary Boolean functions) realizing both AND and NOT, but the interaction gate is not construction-univrsal since it cannot realize the circuit primitive CROSSOVER. (A set of circuit-constructing primitives is universal if the functions CROSSOVER, FANOUT and DELAY are realized.) The device is bit-conserving, that is, signals are neither created nor destroyed, and reversible (information lossless), hence in principle minimally dissipative. Circuits which compute exclusively in terms of these gates may thus lead to more efficient physical realizations operating in closer correspondence with the laws of microphysics underlying any concrete implementation.

Figure 2:
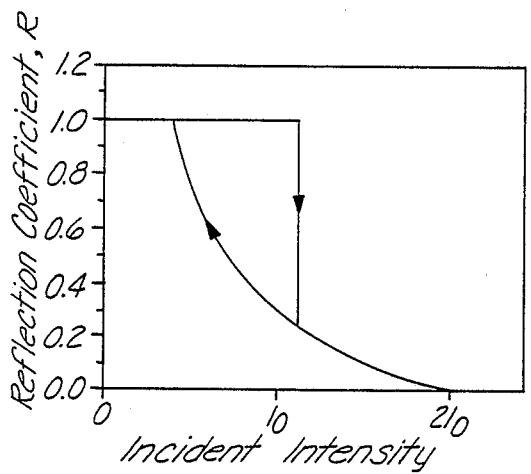
FIG. 2 is a graph showing the reflection coefficient as a function of incident light intensity at $$90° - \theta_{inc} = \frac{90° - \theta_C}{(4.4)^{\frac{1}{2}}}$$

The nonlinear interface (See A. E. Kaplan, Sov. Phys. JETP 45 (1977) 896) can be described as an interface between a region of larger index of refraction, denoted $n_1 = n_{10}$ that is not intensity dependent (i.e., linear) and a region of smaller index of refraction, here denoted $n_2 = n_{10} - \Delta n_L + n_{2NL}(I)$, which is intensity dependent. A light beam is then incident from region 1 onto region 2 at an angle $90° > \theta_{inc} > \theta_C$, where $\theta_C$ is the critical angle for total internal reflection (TIR) to occur at the interface. $\theta_C$ is defined from $\sin \theta_C = n_2/n_1$. Thus, for a low intensity incident beam, the system will exhibit TIR. As the intensity of the incident beam is increased, a switching from TIR to transmission will occur as a result of the change in the index of refraction in region 2 induced by the evanescent field in that region. This switching effect exhibits an intensity hysteresis and yields two distinct and stable output states. The reflection coefficient as a function of incident light intensity is shown in FIG. 2 for $$90° - \theta_{inc} = \frac{90° - \theta_C}{(4.4)^{\frac{1}{2}}}$$

The interaction gate requires two externally resolvable inputs, and generates four outputs, which must also be resolvable. The interaction gate can be realized by a dual-beam version of the nonlinear interface (shown in FIG. 3) or Fabry-Perot (shown in FIG. 5). Both inputs consist of beams of intensity $I_O$. A 1 is coded by the presence of a beam and a 0 is coded by the absence of a beam. Identification of the inputs themselves is done by polarization. For example, the P input might be vertically polarized and the Q input horizontally polarized or vice-versa, permitting all inputs and outputs to be individually resolved from each other. Using the polarization identification technique, the advantage of no coherent addition of light beam can be realized. It should be noted that the hysteresis associated with the switching from transmission to TIR requires that the intensities be zero for a short time between each clock pulse in order to reset the nonlinear interface. Thus, a pulsed-light source input is required.

The input beam can be in one of four different states. Each state can be described as follows.

1. The total intensity of the beam is zero. Neither the P nor the Q beam is switched on ($I_{beam}=0$).
2. The total intensity of the beam is $I_O$ and the field is polarized vertically. P is switched on and Q is switched off ($I_{beam}=I_O$).
3. The total intensity of the beam is $I_O$ and the field is polarized horizontally. P is switched off and Q is switched on ($I_{beam}=I_O$).
4. The total intensity of the beam is $2I_O$ and the field is the sum of the horizontally polarized component and the vertically polarized component. Both P and Q are switched on ($I_{beam}=2I_O$).

If the nonlinear interface is designed appropriately, e.g., $$n_2 = n_{10} - \Delta n_L + n_{2NL}(2I_o)$$

$$90° \geq \theta_{inc} \geq \sin^{-1}\frac{n_{10} - \Delta n_L + n_{2NL}(I_o)}{n_{10}}$$

where $n_{2NL}(I)$ in the nonlinear part of the refractive index as a function of peak beam intensity I, the result will be an all-optical, reversible implementation of the interaction gate.

In the following, each of the input cases described above will be analyzed and the results compared to those required for successful implementation of the interaction gate. Case 1 is the trivial case. No light input yields no light output. This is a requirement for any reversible computing gate. A violation would result in energy being created or destroyed. Case 2 will result in TIR of the input beam. Because the beam is vertically polarized, the output beam will also be vertically polarized, although it will be phase shifted an amount $\phi_{vert}$ due to the Goos-Hanchen effect at the interface. Case 3 will also result in TIR of the input beam. As this beam is horizontally polarized, the output will also be horizontally polarized, although a phase shift of $\phi_{horiz}$ due to the Goos-Hanchen effect at the interface will occur. In general, $\phi_{vert} \neq \phi_{horiz}$, so as the signal propagates through the gate, the phase relationship between P and Q will change depending upon the relationship between the linear and nonlinear indices of refraction. If the time constant of the nonlinearity is long compared with the period of the optical field, the effects of the phase shift can be neglected (See Adrianus Korpel and Adolf W. Lohmann, Appl. Opt. 25 (1986) 1528). Superposition of the phase shifted horizontally and vertically polarized beams of intensity $I_O$ yields a beam with average intensity $2I_O$. Also, it should be noted that phase insensitive outputs detectors (such as the PN junction photodetector) will not be sensitive to the relative phase shift of the two fields. Finally, for Case 4, the result will be (in the plane wave approximation) 100% transmission of the two beams. Since the index of refraction for the two materials was matched for a beam of intensity $2I_O$, there will be no reflection at the interface. Thus, the two beam nonlinear interface just described is a cascadable, reversible interaction gate, and is shown in FIG. 4

In order to construct an interaction gate of the RNI type, two distinct materials are required. Material 1 must have an index of refraction (denoted $n_1 = n_{10}$) which is larger than Material 2 for zero light intensity levels. In addition, the index of Material 2 (denoted $n_2 = n_{10} - \Delta n_L + n_{2NL}(I)$) must closely match the index of Material 1 for the light intensity level $2I_O$. Thus, a switching between TIR and transmission will occur somewhere between $I_O$ and $2I_O$.

The RFP type of interaction gate involves only a Fabry-Perot etalon with a nonlinear material between the highly reflecting mirrors. The device switches between highly reflecting and transmitting states depending upon the intensity of light incident upon it. The material requirement here is simpler than for the RNI in that only a single nonlinear material is necessary and the index can either increase or decrease with incident intensity.

Materials which would be appropriate for constructing an RNI or RFP device are many and varied. Thus, only a few are listed here and this list is not intended to be comprehensive.

1. Semiconductors: Many semiconductors are known to have large nonlinearities associated with their index of refraction. The nonlinearities arise from various mechanisms including thermal effects, free carrier plasma generation, band filling, and excitonic resonance saturation. Examples of these nonlinear semiconductors are InSb, $Al_{1-x}Ga_xAs$, GaAs InAs, $GaAs_{1-x}P_x$, $Zn_{1-x}Mn_xSe$ and ZnSe. All of these materials would be usable in the devices described above.

2. Glass/Liquid Combinations: Several experiments have been performed to demonstrate the function of a single beam nonlinear interface using the Schott Glass/$CS_2$ liquid system. The Kerr nonlinearity inherent in $CS_2$ can be used to construct these devices.

3. Organic Polymers: Various organic compounds are known to have nonlinear components to the index of refraction. One example is Polydiacetylene. These compounds can be used to construct the RNI or the RFP.

In addition to the computing/construction primitive interaction gate, a mechanism is required to perform a CROSSOVER (FIG. 6(a)), of the P and Q lines. In the instant case of an RNI/RFP with inputs coded by their polarizations, any device which will switch the polarization axes for the input beam will function as a CROSSOVER. For example, a half wave plate with its axis oriented at 45° from the vertical will perform this operation. The inputs and outputs of the polarization CROSSOVER are indicated in FIG. 6(b). The combination of the RNI/RFP and an appropriate CROSSOVER is construction-universal (CROSSOVER, FANOUT and DELAY realized). Thus, use of the device will permit digital optical computing circuits of arbitrary complexity to be implemented solely in terms of the RNI/RFP and CROSSOVER primitives.

Figure 7A:
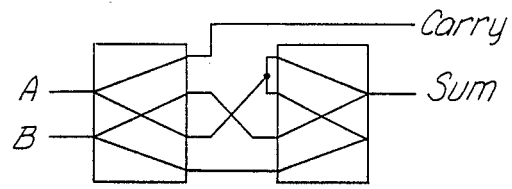
Figure 7B:
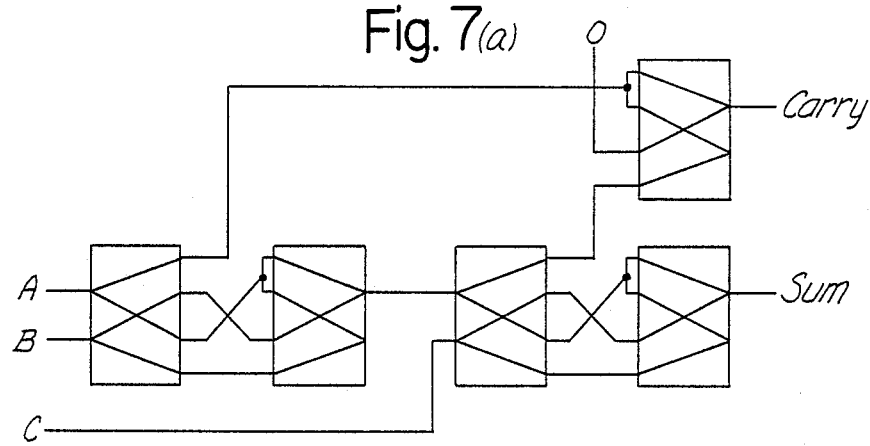

An all optical design for implementing a binary half-adder with interaction gates is shown in FIG. 7(a). The circuit requires an interaction gate with one input set high (FANOUT) and two signal interaction gates. A 1-bit half-adder adds two binary digits $A_i$ and $B_i$ and outputs the sum $A_i \oplus B_i$ and carry $A_i B_i$. A 1-bit full-adder is a device which adds three binary digits, the arguments $A_i$ and $B_i$ together with the carry-in $C_i$. It outputs the sum $A_i \oplus B_i \oplus C_i$ and carry $C_{i+1} = A_i B_i + A_i C_i + B_i C_i$. FIG. 7(b) shows a design for implementing an all-optical full-adder with interaction gates. While this implementation requires only five computing gates, a minimum of nine are required for electronic implementation. Similarly, restricted optical Fredkin gates have been shown to have five-gate adder implementations (See R. Cuykendall and D. McMillin, Appl. Opt. 26, (1987) 1959). A recent alternative design for a full-adder employing Fabry-Perot bistable devices has been proposed (See B. S. Wherrett, Opt. Commun. 56 (1985) 87), but due to the intrinsic losses resulting from the use of half-silvered mirrors in the design, the adder is not cascadable (required for ith stage carry-in) without some form of external signal amplification.

FIGS. 8 through 11 show an all-optical RNI/REP half-adder, full-adder, sequential n-bit adder, and cascade adder.

Although not without some free energy loss, the physical processes underlying a change in the optical constants of a solid permit relatively low absorption with an association change in the index of refraction sufficient to observe bistable hysteresis and switching at the interface. Thus, only a small amount of the signal intensity would be absorbed as it passed through the gate. Also due to the reversible nature of the gate, in no case would it be required to serve as a sink for input energy. The result is a computation-universal optical computing gate that more fully exploits the underlying laws of microphysics.

The interaction gate can also be realized using an appropriate F-P switch oriented at 45° from the beam axis (see FIG. 5). If the F-P element exhibits high reflection for intensity $I_O$ and high transmission for intensity $2I_O$, and the inputs are associated with orthogonal polarizations, the result is an alternative implementation of an interaction gate. One disadvantage to this type of device however, is the artificially slow cavity build-up time. The RNI is not subject to this type of fundamental limit.

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

We claim:

1. An optical logic gate, comprising:
   an interaction gate including a first material having an index of refraction and a second material disposed in intimate contact with said first material, said second material having a nonlinear index of refraction and forming a nonlinear interface, said second material having an index of refraction less than that of the first material for low intensities such that light beams having a first lower intensity reflect from said nonlinear interface and light beams having a second higher intensity pass through said nonlinear interface; and
   means for generating a pair of light beams of approximately equal intensity, said generating means including means for distinguishing said pair of light beam, means for selectively switching each beam of said pair of light beams on and off, and means for directing said pair of light beams at an angle upon said nonlinear interface.

2. The optical logic gate of claim 1 wherein said first material has a linear index of refraction.

3. The optical logic gate of claim 1 wherein said means for distinguishing said pair of light beams includes means for selectively and distinctly polarizing each of said pair of light beams.

4. The optical logic gate of claim 1 wherein said means for distinguishing said pair of light beams includes means for selectively and distinctly modifying the frequency of each of said pair of light beams.

5. The optical logic gate of claim 1 wherein said means for distinguishing said pair of light beams includes means for selectively and distinctly pulse coding each of said pair of light beams.

6. The optical logic gate of claim 1 wherein said pair of light beams are coaxial.

7. An optical logic gate, comprising:
   an interaction gate comprised of a material with a nonlinear index of refraction sandwiched between two reflective surfaces, forming a nonlinear Fabry-Perot etalon such that light beams having a first lower intensity reflect from said etalon and light beams having a second higher intensity pass through said etalon, and
   means for generating a pair of light beams of approximately equal intensity, said generating means including means for distinguishing said pair of light beams, means for selectively switching each beam of said pair of light beams on and off; and means for directing said pair of light beams at an angle upon said etalon.

8. The optical logic gate of claim 7 wherein said means for distinguishing said pair of light beams includes means for selectively and distinctly polarizing each of said pair of light beams.

9. The optical logic gate of claim 7 wherein said means for distinguishing said pair of light beams includes means for selectively and distinctly modifying the frequency of each of said pair of light beams.

10. The optical logic gate of claim 7 wherein said means for distinguishing said pair of light beams includes means for selectively and distinctly pulse coding each of said pair of light beams.

11. The optical logic gate of claim 7 wherein said pair of light beams are coaxial.

12. An optical logic gate, comprising:
- an interaction gate including a first material having an index of refraction and a second material having a nonlinear index of refraction, said first material and said second material being disposed in intimate contact with each other to form a nonlinear interface;
- means for selectively generating and directing two distinguishable light beams of approximately equal intensity upon said nonlinear interface such that when said light beams have a first lower total intensity said light beams reflect from said nonlinear interface and when said light beams have a second higher total intensity said light beams pass through said nonlinear interface.

13. The optical logic gate of claim 12 wherein said first material has a linear index of refraction.

14. The optical logic gate of claim 12 wherein said light beams are distinguished by selectively and distinctly polarizing said light beams.

15. The optical logic gate of claim 12 wherein said light beams are distinguished by selectively and distinctly modifying the frequency of said light beams.

16. The optical logic gate of claim 12 wherein said light beams are distinguished by selectively and distinctly pulse coding each of said light beams.

17. The optical logic gate of claim 12 wherein said light beams are coaxial.

18. An optical logic gate, comprising:
- an interaction gate comprised of a material with a nonlinear index of refraction sandwiched between two reflective surfaces forming a nonlinear Fabry-Perot etalon;
- means for selectively generating and directing two distinguishable light beams of approximately equal intensity upon said etalon such that when said light beams have a first lower total intensity said light beams reflect from said etalon and when said light beams have a second higher total intensity said light beams pass through said etalon.

19. The optical logic gate of claim 18 wherein said light beams are distinguished by selectively and distinctly polarizing each of said light beams.

20. The optical logic gate of claim 18 wherein said light beams are distinguished by selectively and distinctly modifying the frequency of each of said light beams.

21. The optical logic gate of claim 18 wherein said light beams are distinguished by selectively and distinctly pulse coding each of said light beams.

22. The optical logic gate of claim 18 wherein said light beams are coaxial.

* * * * *